When jet-propelled missiles are carried on vehicles or craft such as motor vehicles, aircraft or ships, it is difficult to anchor them on the launching base so that they keep their position unchanged despite the accelerations and jarring or vibration occurring during transport, and at the same time can be released for launching at the instant of initiation of ignition.

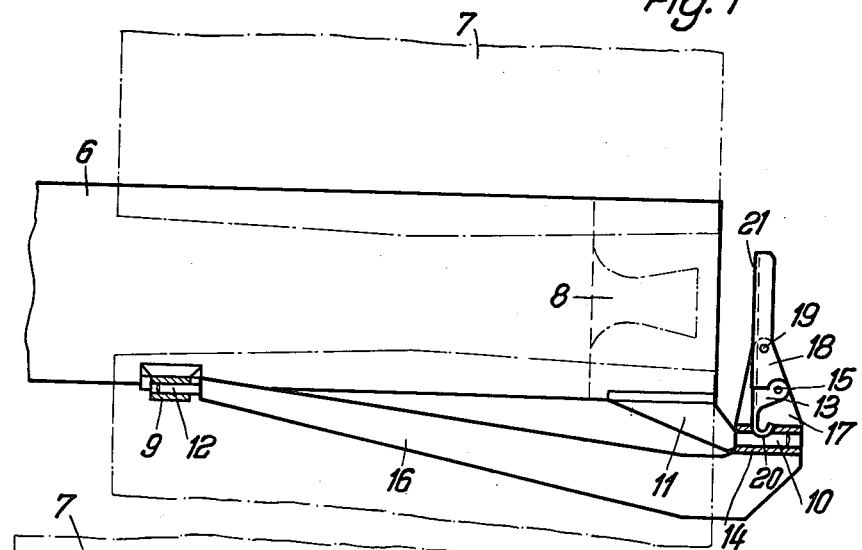
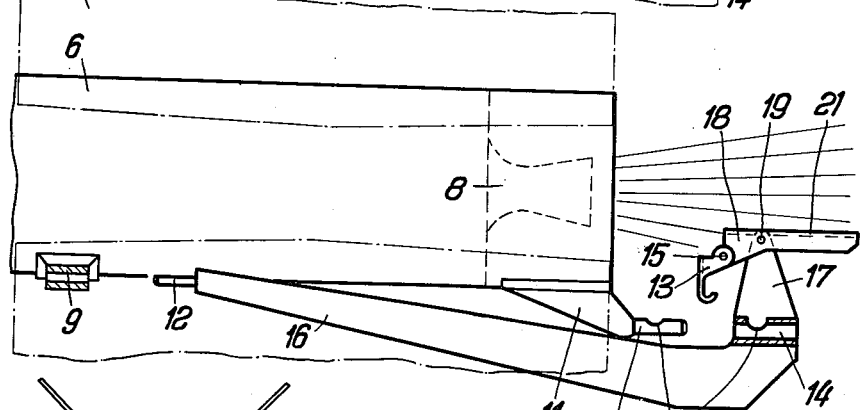
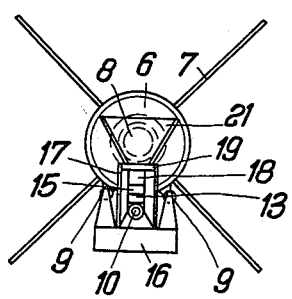
Inventor:
Theodor Bornhöft 3,076,385
LAUNCHING RACKS FOR FLYING BODIES
Theodor Bornhöft, Vaterstetten, Upper Bavaria, Germany, assignor to Bolkow-Entwicklungen K.G., Munich, Germany
Filed June 6, 1960, Ser. No. 33,996
Claims priority, application Germany June 9, 1959
2 Claims. (Cl. 89—1.7)

It is known to hold or so to clamp jet-propelled missiles on the launching device by means of special locking members such as spring-loaded catches, shearing pins or the like, that the thrust of the nozzle overcomes the retaining force of the locking member and the missile is released. Thus, for example, the locking member may be only of such thickness or be only so strongly locked that it is overcome or sheared off, as the case may be, by the thrust when the power plant begins to fire. This arrangement has the drawback that during transport the missile may become prematurely unlocked or otherwise loosened owing to vibration or the like and change its position.

It is furthermore known to lock jet-propelled missiles firmly on their base or carry them in a lockable holder or tube and to release the securing means mechanically or electrically, possibly by remote control, shortly before ignition. The time delay obtaining between the instant of disengagement of the locking device and that of take-off or separation of the missile may possibly be so great that the missile is brought out of its predetermined position by uncontrolled forces into a position which is unfavourable for the launch. The invention aims to overcome these drawbacks.

According to the invention, a missile locking arrangement wherein the missile is held in position in form-locking or positive fashion before the power plant is ignited is disengaged by means of a release element moved by the propelling jet of the power plant.

The device holding the missile on launching is so designed that the latter slides in a guide at least for a short time. A latch holding the missile in position is connected, if required by way of intermediate members, to the release element located in the propelling jet. In this way, a stable position of the missile is ensured right up to the moment of separation from the launching frame. By means of a suitably powerful locking action, it is possible to arrange that the launch takes place only when the power plant of the missile is producing the necessary thrust with certainty.

According to a preferred embodiment of the invention, the release element is attached to a two-armed lever, the second arm of which is connected by way of a toggle joint to the latch holding the missile. In order to prevent spontaneous release of the locking device, the toggle joint is designed so as to swivel resiliently in manner known per se beyond the dead centre. In this connection, the position in which the resilient member is located is immaterial. Either a lever of the toggle joint or one of the pins may be of resilient construction for this purpose.

As an alternative, an electrical connection may be provided for transmitting the thrust from the control element suspended in the driving jet to the locking device. In this way it is rendered possible, even in the case of relatively small air forces or loads, to obtain certain release of the locking device of the missile on the launching frame. Moreover, it is possible to enable the missile to be secured in simple manner by breaking the connection.

The invention is suitable both for reaction-driven and for propeller-driven missiles. However, application to reaction-driven missiles is particularly recommendable because of the intense jet from the nozzle.

The arrangement according to the invention is preferably suitable for launching frames mounted on vehicles or craft, as may be gathered from what has been said above, but its use is not limited to such launching frames.

An embodiment of the invention is illustrated in the accompanying drawing and is described hereinafter.

In the drawing:
FIG. 1 is a side view of a missile on the launching apparatus prior to release;
FIG. 2 shows the same missile on launching immediately after release;
FIG. 3 is a view of the arrangement shown in FIG. 1 from the rear.

A missile, comprising the body 6, the fins 7 and the thrust nozzle 8, has a sleeve 9 and a pin 10 for securing it on the launching frame. The pin 10 is mounted on a special arm or bracket 11. By means of the pin 10 and the sleeves 9, the missile is mounted in or on complementary retaining members in the form of a sleeve 14 and a pin 12 on the launching support 16 of the launching frame. The pin 10 is provided with a notch 20 which coincides, when the missile is on the launching frame, with a semi-cylindrical notch in sleeve 14.

The means for locking the missile to the frame consists of a thrust element 21 located in the jet from the nozzle and mounted on a toggle lever 18. This toggle lever 18 is mounted in the side plates 17 of a bearing bracket on the launching frame by means of a pin 19. A latch 13 is pivotally attached to the lower end of the double lever 18 by means of a pin 15 and is held in its inoperative position by resilient means. For this purpose, the pin 15 forming the fulcrum of the toggle lever may consist of resilient material. Other elements serving to hold the toggle lever or a part of the toggle lever, such as the latch 13, may also be of resilient construction. Furthermore, separate spring means may, of course, be provided.

The levers 18 and 13 normally abut end to end when the missile is locked in the frame and by suitable arrangement of the pivot points 15, 19 and 20, the levers form a toggle joint whose abutment is located close behind the dead centre.

On the starting up of the nozzle jet, the impingement surface 21 on the double lever 18 is forced rearwardly. The axis of the pin 15 thereby travels forwardly along an arc about the axis of the pin 19. The resiliently yielding latch 13 permits this movement as far as the dead centre, at which the pivot axes at 19, 15, 20 are disposed in one plane. From this point on, the movement of release is assisted by the spring force of the latch 13, so that rapid unlocking takes place and the pin 10 is fully released, as shown in FIG. 2.

For opening the latch a force is required which further tensions the pre-tensioned spring in the latch 13. A corresponding force acts at the same moment through the incipient thrust of the missile on the notch 20 in the pin 10, which could give rise to jamming of the locking device. By suitable rounding of said notch 20, however, any jamming of the latch 13 is avoided.

The launching support 16 can be used again immediately after the launching of a missile, since the parts 13, 18, 21 are moved back by their own weight into the position shown in FIG. 1. Thus, manual adjustment of the release device is dispensed with.

In the embodiment described above, the thrust element 21 is an actuating element. Without altering the idea of the invention, the thrust element may also be designed as a control element.

The launching support which is disposed on a vehicle or craft may be mounted so that it can be pivoted and fixed in position and a plurality of such supports may be mounted if required on one vehicle or craft.

I claim:
1. Launching frame for jet-propelled missiles comprising two sleeves arranged on both sides of the missile, two pins arranged on the launching frame, the bores of the sleeves being adapted to receive the pins to hold the missile on the launching frame free for movement in the starting direction, a lever pivotally arranged on the launching frame at a distance from the position of the outlet opening of the thrust nozzle of the missile when in position on the frame, a locking latch pivotally mounted on said lever, a third pin arranged on the missile, a third sleeve arranged on the launching frame and having a bore adapted to receive said third pin, said pin having a notch, the free end of said locking latch having an arcuate zone engaging in said notch, the bores of all said sleeves extending in parallel direction with the launching direction of the missile, the pivot axis of said lever, the pivot axis and the arcuate zone of said locking latch forming a toggle joint having the pivot axis of said locking latch close behind the dead center to lock the missile in the starting direction, an impingement plate on said lever, said impingement plate being greater than the cross-sectional area of the nozzle and against which plate, when the thrust nozzle is set in operation, the stream of gas issuing from the nozzle impinges substantially at right angles onto the impingement plate so that the impingement plate and the lever are swung about the pivot axis of said lever, said locking latch remaining engaged in said notch until the pivot axis of said locking latch has moved past the dead center at which time said locking latch is immediately disengaged from the notch and the nozzle is free to move in the launching direction.

2. Launching frame as claimed in claim 1, wherein resilient means is associated with the latch so that the first part of the swinging movement of the impingement plate is carried out in opposition to the resistance of said resilient means and so that, after the dead center position of the toggle joint has been passed, the stress of the resilient means assists the disengagement of the latch during the remainder of the pivotal movement of the impingement plate.

References Cited in the file of this patent
UNITED STATES PATENTS

| | | |
|---|---|---|
| 2,440,723 | MacDonald | May 4, 1948 |
| 2,706,431 | Grill | Apr. 19, 1955 |
| 2,712,270 | Green | July 5, 1955 |
| 2,751,818 | Bonnett | June 26, 1956 |
| 2,780,143 | Graham | Feb. 5, 1957 |
| 2,792,756 | Schneiter | May 21, 1957 |
| 2,849,922 | Petterson | Sept. 2, 1958 |